L. Taylor.

Mop Head.

No. 3,192. Reissued Nov. 10, 1868.

Witnesses
Sam'l H. Porter
David A. Smith

Inventor
Luke Taylor

N. PETERS, PHOTO-LITHOGRAPHER, WASHINGTON, D. C.

United States Patent Office.

LUKE TAYLOR, OF SPRINGFIELD, VERMONT.

*Letters Patent No.* 22,990, *dated February* 15, 1859; *reissue No.* 3,192, *dated November* 10, 1868; *reissue No.* 3,215, *dated November* 24, 1868; *reissue No.* 3,682, *dated October* 19, 1869.

IMPROVED MOP-HEAD.

The Schedule referred to in these Letters Patent and making part of the same.

*To all whom it may concern:*

Be it known that I, LUKE TAYLOR, of Springfield, in the county of Windsor, and State of Vermont, have invented a new and improved Mop-Head; and I do hereby declare that the following is a full, clear, and exact description of the same, reference being had to the annexed drawings, making a part of this specification, in which—

Similar letters of reference indicate corresponding parts in the two figures.

To enable those skilled in the art to fully understand and construct my invention, I will proceed to describe it.

A represents the handle of the mop-head, said handle being constructed of a tough, elastic wood, and B represents the stationary jaw of the head, which is of T-form, one portion, *a*, being a socket, which is fitted on the end of the handle A, and secured permanently thereto by means of rivets *a'*, one or more.

On the handle A, below the socket *a*, and between said socket and a shoulder, $a^{\times}$, on the handle, a collar, C, of cast-iron, is placed, and allowed to turn freely, the lower end of said collar having projections *b* attached, for the purpose of allowing said collar to be readily turned by the hand or thumb and fingers.

On this collar there is cast a screw-thread, *c*, on which a nut, D, works.

The nut D is provided with projecting ears *c' c'* at opposite sides of it, and to these ears *c' c'* the ends of a jaw, E, are attached.

Figure 1:
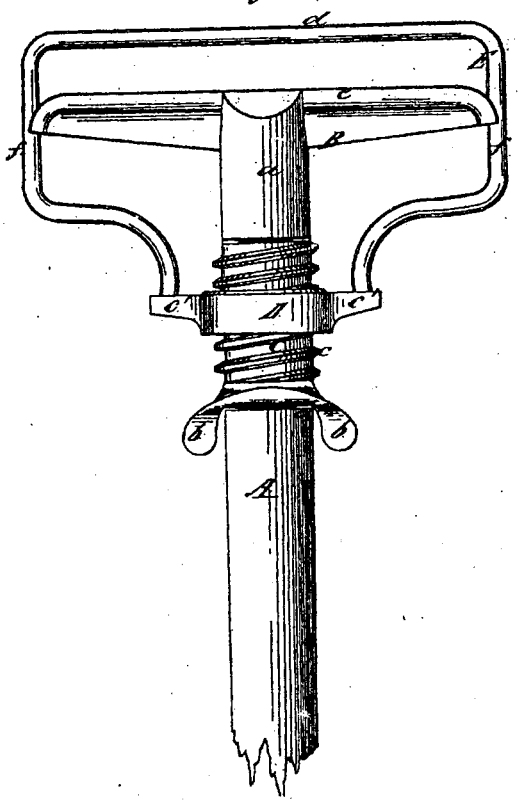
Figure 1 is an external view of my invention.
Figure 2:
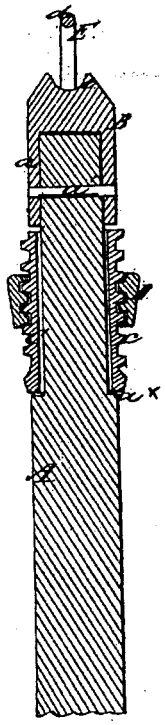
Figure 2 is a longitudinal section of the same, taken in line *x x*, fig. 1.

The jaw E is formed of a curved wrought-iron rod, so bent that a portion, *d*, of it will be parallel with the portion *e* of the stationary jaw B, and the remaining portions, *f f*, so bent that they will pass around the ends of the stationary jaw B, fitting in recesses therein, and serving as guides, and their lower parts curved so as to be attached to the projecting ears *c' c'* of the nut D, as shown clearly in fig. 1.

The stationary jaw B may be of cast-iron, malleable, if desired, and the collar C, with its screw *c*, may be of the same material.

From the above description, it will be seen that by simply turning the collar C, the jaw E will be moved in and out from the stationary jaw B, and the cloth or mop firmly secured in the head or between the two jaws, and also readily released or detached therefrom when necessary.

I am aware that the nut operating the movable jaws or binders of mop-heads have been manipulated by means of a nut, with ears or projections placed between the movable jaws or binders and the cross-head.

I am also aware that mop-heads have been made with an external screw-thread, of wrought-iron or wood, cut on the handle or shaft, and working into a wrought-iron nut, or internal screw cut into the cross-head or yoke of a movable jaw; but the wooden screw, by reason of its swelling and binding when wet, and the wrought-iron screw rusting and binding, and the fineness or closeness of the screw-threads, made the process of tightening and loosening the mop a slow process, and rendering the mop-head, thus constructed, inoperative and of little value. These, therefore, I do not claim, broadly, or in themselves considered; but What I do claim as new, and desire to secure by Letters Patent, is—

1. In a mop-head, in which the cross-head or stationary jaw is attached permanently and immovably to the handle, operating the movable jaw or binder by means of a tubular screw or socket fitted on the handle, and having its screw-thread on its exterior, in combination with a nut encompassing the screw, and connected with the movable jaw, so as to operate substantially as shown and described.

2. In a mop-head, in which the movable jaw or binder is operated through the medium of a screw-nut or collar, by means of thumb-ears attached to or formed with the said screw-nut or collar, placing the said ears outside the yoke or bow of the movable jaw or binder aforesaid, as herein described, for the purpose set forth.

LUKE TAYLOR.

Witnesses:
S. J. YOUNG,
JAMES DAVIS.